US011661542B2

(12) United States Patent
Kadam et al.

(10) Patent No.: US 11,661,542 B2
(45) Date of Patent: May 30, 2023

(54) STIMULI RESPONSIVE POLYMERS FOR LOST CIRCULATION APPLICATIONS

(71) Applicant: Halliburton Energy Services, Inc., Houston, TX (US)

(72) Inventors: Sunita Sameer Kadam, Pune (IN); William Walter Shumway, Houston, TX (US); Rahul Chandrakant Patil, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 90 days.

(21) Appl. No.: 16/923,926

(22) Filed: Jul. 8, 2020

(65) Prior Publication Data

US 2022/0010194 A1  Jan. 13, 2022

(51) Int. Cl.
*C09K 8/508* (2006.01)
*C09K 8/512* (2006.01)
*C08F 20/34* (2006.01)
*E21B 33/13* (2006.01)
*E21B 43/22* (2006.01)

(52) U.S. Cl.
CPC ............ *C09K 8/5083* (2013.01); *C08F 20/34* (2013.01); *C09K 8/512* (2013.01)

(58) Field of Classification Search
CPC ........ E21B 43/26; E21B 43/267; E21B 33/13; E21B 21/00; E21B 33/14; E21B 43/16; E21B 43/25; E21B 21/003; E21B 21/062
See application file for complete search history.

(56) References Cited

U.S. PATENT DOCUMENTS

| 4,635,726 A | 1/1987 | Walker |
| 6,153,669 A | 11/2000 | Diggs et al. |
| 6,562,762 B2 | 5/2003 | Cowan et al. |
| 7,341,106 B2 | 3/2008 | Reddy et al. |

(Continued)

FOREIGN PATENT DOCUMENTS

| CA | 2946847 A1 * | 12/2015 | ............. C09K 8/685 |
| WO | 2018169654 | 9/2018 | |

OTHER PUBLICATIONS

Deirram et al., Hydrolysis Degradation of Polycarbonate Using Different Co-solvent Under Microwave Irradiation. (Year: 2012).*

(Continued)

*Primary Examiner* — Zakiya W Bates
(74) *Attorney, Agent, or Firm* — Thomas Rooney; C. Tumey Law Group PLLC

(57) ABSTRACT

Provided is a method for mitigating a lost circulation zone. The method may include providing a lost circulation treatment composition that may include an acid responsive polymer that may include at least one monomer, at least one comonomer, and at least one crosslinker; a carbonate-based solvent; and a carrier fluid that may include water. The method may also include introducing the lost circulation treatment composition into a wellbore within a subterranean formation, wherein the subterranean formation may include the lost circulation zone; placing the lost circulation treatment composition into the lost circulation zone, hydrolyzing the carbonate-based solvent to generate carbon dioxide, and causing the swelling (change of shape) of acid responsive polymer to mitigate the losses.

20 Claims, 3 Drawing Sheets

(56) References Cited

U.S. PATENT DOCUMENTS

| | | | |
|---|---|---|---|
| 8,685,903 B2 | 4/2014 | Ravi et al. | |
| 2013/0172450 A1 | 7/2013 | Lewis et al. | |
| 2013/0233553 A1 | 9/2013 | Bugrin et al. | |
| 2014/0135237 A1 | 5/2014 | Villarreal, Jr. et al. | |
| 2014/0353042 A1 | 12/2014 | Karale et al. | |
| 2017/0145283 A1 | 5/2017 | Villarreal et al. | |
| 2018/0037798 A1 | 2/2018 | Mishra | |
| 2018/0155605 A1 | 6/2018 | Chatterji et al. | |
| 2018/0201828 A1 | 7/2018 | Pravesh et al. | |
| 2018/0215987 A1 | 8/2018 | Mcaniel et al. | |
| 2019/0119559 A1* | 4/2019 | O'Toole | C09K 8/594 |
| 2019/0376363 A1 | 12/2019 | Kadam et al. | |
| 2020/0131424 A1 | 4/2020 | Ravi et al. | |

OTHER PUBLICATIONS

International Search Report and Written Opinion for Application No. PCT/US2020/042798, dated Apr. 5, 2021.

\* cited by examiner

Butylene Carbonate → Slower

Propylene Carbonate → Medium

Glycerol Carbonate → Fast

STIMULI RESPONSIVE POLYMERS FOR LOST CIRCULATION APPLICATIONS

BACKGROUND

In the oil and gas industry, a common problem in drilling wells or boreholes in subterranean formations is the loss of circulation of fluids, such as drilling fluids or muds, out of the borehole and into the subterranean formation during the drilling. Such lost fluids typically go into fractures or other openings that may be preexisting or possibly induced by excessive pressures during the subterranean operation. A large variety of materials have been used or proposed in attempts to cure lost circulation. Traditional fluid loss materials are generally categorized as either solid materials or settable/polymeric materials. Traditional solid materials may be divided into three types or categories fibrous materials, such as shredded automobile tires or sawdust; flaky materials, such as wood chips and mica flakes; and granular materials, such as ground nutshells. Settable materials include, for example, cement slurries, whose strength increases with time after placement. Polymeric materials include, for example, polyacrylamide dispersed in water that may then emulsify in a paraffinic mineral oil, typically using a polyamine as an emulsifier.

BRIEF DESCRIPTION OF THE DRAWINGS

These drawings illustrate certain aspects of the present disclosure and should not be used to limit or define the disclosure.

DETAILED DESCRIPTION

Figure 1:
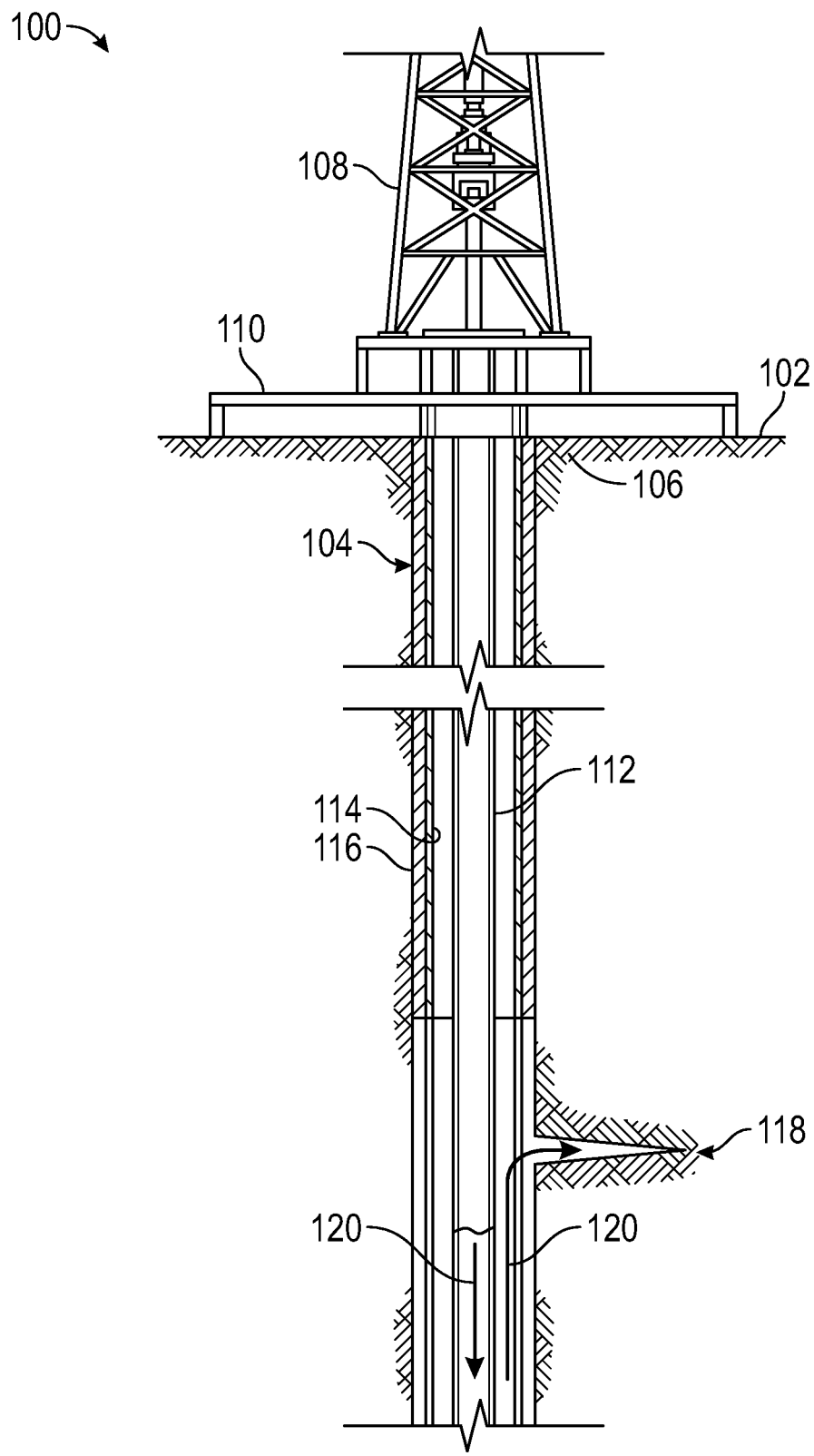
FIG. 1 illustrates the introduction of a lost circulation treatment composition into a lost circulation zone within a wellbore penetrating a subterranean formation in accordance with example embodiments of the present disclosure.

The present disclosure pertains to methods and compositions for preventing or alleviating the loss of well treatment fluids, such as drilling fluids, into a subterranean formation during drilling or construction of boreholes therein. In particular, the present disclosure relates to the introduction of stimuli responsive polymers into a wellbore to reduce the loss of fluid into a subterranean formation. There may be several potential advantages to the disclosed methods and compositions, only some of which may be alluded to herein. One of the many potential advantages of the methods and compositions is that the lost-circulation materials may be stimuli responsive materials. Lost circulation materials that respond in the presence of acid, water, or combinations thereof, may provide better results as compared to lost circulation materials that are not stimuli responsive.

Loss of drilling fluid while drilling is an inevitable part of drilling operations, which may cause non-productive time on a rig. In view of this, drilling carbonate formations may prove to be difficult. The carbonate formations may be naturally highly fractured, or fragile. These formations may have the complex porosity and permeability variations with irregular fluid flow paths. Minimal or even complete loss of circulation may be encountered when drilling into these types of carbonate formations. This problem may be a rate determining step for drilling operations in such formations. The use of particulate material may not be successful in such formations. Therefore, stimuli responsive polymers activated using carbonate-based solvents as non-damaging loss circulation material for fractured carbonate reservoir are disclosed herein. The stimuli responsive polymers disclosed herein are acid responsive polymers ("ARP"). The acid responsive polymers may be used in a lost circulation treatment composition. As disclosed herein, the lost circulation treatment composition may be comprised of one or more acid responsive polymers, carbonate-based solvent, and a carrier fluid comprising water, wherein the water may come from the formation, in situ, or it may be included in a pumped formulation of the compositions disclosed herein.

The lost circulation treatment composition may be comprised of any suitable acid responsive polymer. An acid responsive polymer is a pH sensitive or pH responsive polymer that may respond to the changes in the pH of a surrounding medium by varying its dimensions. Materials may swell, shrink, or change depending on the pH of their environment. This behavior may be exhibited due to the presence of certain functional groups in the polymer chain. pH-sensitive materials may be either acidic or basic, responding to either acidic or basic pH values. These polymers may be designed with many different architectures for different applications. Generally, key uses of pH sensitive polymers may include controlled drug delivery systems, biomimetics, micromechanical systems, separation processes, and surface functionalization.

Acid responsive polymers are pH sensitive polymers comprised of basic functional groups that may include, but are not limited to, amines, wherein the amines may be primary, secondary or tertiary amines, e.g. poly (N,N-dialkyl aminoethyl methacrylates), poly(L-lysine), poly(ethylenimine) and chitosan. The general form of the polymer is a backbone with functional "pendant groups" that hang off of it. When these functional groups become ionized in certain pH levels, they may acquire a charge. Repulsions between like charges may cause the polymers to change shape. Moreover, acid responsive polymers may be polyamines or cationic polymers. Polyamines may accept protons at low pH values. The positive charges may create a repulsion that causes the polymer to swell. This swelling behavior may be observed when the pH is greater than the pKa of the polymer. Alternatively, acid responsive polymers may undergo a solution-to-gel transition with a change in pH. Further, the gel may change from a stiff gel to a soft gel for certain pH values.

Acid responsive polymers may be synthesized using various polymerization methods. Functional groups may need to be protected so that they do not react depending on the type of polymerization. For example, polymerization methods may include, but are not limited to, free radical solution or bulk polymerization, group transfer polymerization, atom transfer radical polymerization, reversible addition-fragmentation chain transfer, graft co-polymerization, emulsion polymerization, suspension polymerization.

The acid-responsive polymers may be comprised of at least one or more monomers, one or more comonomers, and one or more crosslinkers. The monomers and the comonomers may be acid responsive monomers that may include one or more basic functional groups and one or more alkenes (e.g., mono-vinyl monomers) or alkynes. The basic functional groups may include, but are not limited to, one or more amines, amides, salts thereof, or any combination thereof. The alkene and/or alkyne may comprise a hydrocarbyl group containing one, two, or more unsaturated bonds, such as a diene or an olefin. In some examples, the monomer and/or comonomer may also include one or more alkene, such as methylene. The monomer may have the chemical formula:

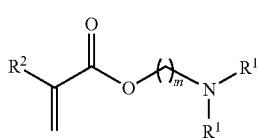

(a)

where each $R^1$ and $R^2$ is independently a substituted or unsubstituted linear, branched, cyclic, heterocyclic, or aromatic hydrocarbyl group and m is an integral of 1, 2, 3, 4, 5, 6, 7, 8, 9, or 10. In some examples, each $R^1$ and $R^2$ is independently a $C_1$-$C_{10}$ alkyl and m is an integral in a range from 1 to 8. In other examples, each $R^1$ and $R^2$ is independently a $C_1$-$C_5$ alkyl and m is an integral in a range from 1 to 5. The $C_1$-$C_{10}$ alkyl may be methyl, ethyl, propyl, butyl, pentyl, hexyl, heptyl, octyl, nonyl, or decyl. In one or more examples, each $R^1$ is independently a $C_1$-$C_{10}$ alkyl, $R^2$ is a substituted or unsubstituted linear, branched, cyclic, heterocyclic, or aromatic hydrocarbyl group, and m is an integral in a range from 1 to 5.

In some examples when m is 2, the monomer includes a dialkylaminoethyl group and the monomer has the chemical formula:

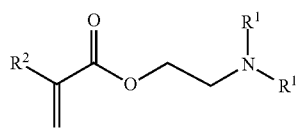

(b)

where each $R^1$ is independently a $C_1$-$C_5$ alkyl and $R^2$ is a $C_1$-$C_5$ alkyl, a phenyl, or an aryl. The monomer can include shorter alkyls such that each $R^1$ and $R^2$ is independently a $C_1$-$C_3$ alkyl, such as, methyl, ethyl, or propyl. In a specific example, each $R^1$ and $R^2$ is methyl and the monomer is N,N-dimethylaminoethyl methacrylate (DMAEMA) having the chemical formula:

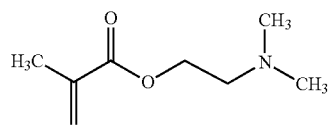

(c)

The comonomer may be an alkene or mono-vinyl with the chemical formula $R^3$—CH=$CH_2$, where $R^3$ is a substituted or unsubstituted linear, branched, cyclic, heterocyclic, or aromatic hydrocarbyl group. In one or more examples, $R^3$ is a phenyl, an aryl, or a $C_1$-$C_{10}$ alkyl. For example, $R^3$ is a phenyl and the comonomer is styrene. In other examples, $R^3$ is an aryl and the comonomer is a functionalized styrene. Each of the monomers and comonomers may independently be or include, but is not limited to, one or more of alkyl acrylates, alkyl methacrylates, cyclohexyl acrylates, cyclohexyl methacrylates, aryl acrylates, aryl methacrylates, aminoalkyl acrylates, aminoalkyl methacrylates, alkyl vinyl ethers, styrene, acrylonitrile, 2-vinyl pyridine, 4-vinyl pyridine, and vinyl acetate, salts thereof, derivatives thereof, or any combination thereof.

The crosslinker may have the chemical formula:

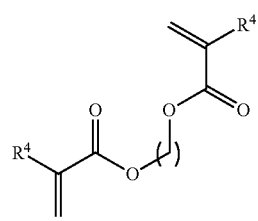

(d)

where each $R^4$ is independently a substituted or unsubstituted linear, branched, cyclic, heterocyclic, or aromatic hydrocarbyl group and n is an integral of 1, 2, 3, 4, 5, 6, 7, 8, 9, or 10. In some examples, each $R^4$ is independently a $C_1$-$C_{10}$ alkyl, a phenyl, or an aryl and n is an integral in a range from 1 to 5. In other examples, each $R^4$ is independently a $C_1$-$C_5$ alkyl, a phenyl, or an aryl and n is an integral in a range from 1 to 3.

In some examples when n is 2, the crosslinker includes an ethylene glycol motif and has the chemical formula:

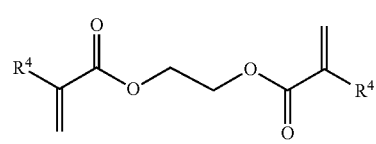

(e)

where each $R^4$ is independently a $C_1$-$C_5$ alkyl, a phenyl, or an aryl. The crosslinker can include shorter alkyls such that each $R^4$ is independently a $C_1$-$C_3$ alkyl, such as, methyl, ethyl, or propyl. In a specific example, each $R^4$ is methyl and the crosslinker is ethylene glycol dimethacrylate (EGDMA) having the chemical formula:

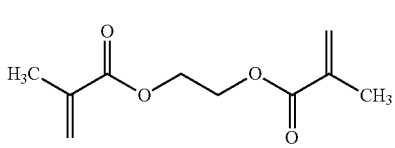

(f)

The acid responsive polymer composition may include the monomer in an amount of about 50% to about 90%, based on the total moles of the monomer, the comonomer, and the crosslinker. Alternatively, the acid responsive polymer composition may include the monomer in an amount of about 50% to about 90%, about 55% to about 85%, about 60% to 80%, or about 65% to about 75% based on the total moles of the monomer, the comonomer, and the crosslinker.

The acid responsive polymer composition may include the comonomer in an amount of about 0% to about 30%, based on the total moles of the monomer, the comonomer, and the crosslinker. Alternatively, the acid-responsive polymer composition may include the comonomer in an amount of about 0% to about 30%, about 1% to about 25%, about 5% to about 20%, or about 10% to about 15% based on the total moles of the monomer, the comonomer, and the crosslinker.

The acid responsive polymer composition may include the crosslinker in an amount of about 1% to about 20%, based on the total moles of the monomer, the comonomer, and the crosslinker. Alternatively, the acid responsive polymer composition may include the crosslinker in an amount of about 1% to about 20%, about 2% to about 18%, about 3% to about 16%, about 4% to about 14%, about 5% to about 12%, or about 6% to about 10% based on the total moles of the monomer, the comonomer, and the crosslinker.

Moreover, the acid-responsive polymer may be resent in the lost circulation treatment composition in an amount of about 1% to about 50% by weight of the lost circulation treatment composition. Alternatively, the acid-responsive polymer may be resent in the lost circulation treatment composition in an amount of about 1% to about 50%, about 5% to about 45%, about 10% to about 40%, about 15% to about 35%, or about 20% to about 30% by weight of the lost circulation treatment composition.

The lost circulation treatment composition may be comprised of any suitable carbonate-based solvent. Carbonate-based solvents comprise the required reaction kinetics to release carbon dioxide when mixed with water or specific oils. Therefore, the rate of carbon dioxide generation may be tuned based on temperature, which, in turn, may be used to control the timing and the degree of polymer swelling. Organic carbonate solvents may be classified as polar solvents and may have a wide liquid temperature range. For example, propylene carbonate has a melting point of −55° C., and a boiling point of 240° C. Additional advantages may include low ecotoxicity and good biodegradability. The organic carbonates may be miscible or mostly miscible with water, oil, or a combination thereof. In the presence of water, the carbonate-based solvent or organic carbonates may regenerate carbonic acid. The rate of carbonic acid generation may vary, depending upon the functional groups present.

Organic carbonate solvents, carbonate esters, or organo-carbonates may include, but are not limited to, propylene carbonate, butylene carbonate, glycerol carbonate, dimethyl carbonate, and ethylene carbonate. The carbonate ester is an ester of carbonic acid, wherein the functional group consists of a carbonyl group flanked by two alkoxy groups. The general structure of the carbonates is $R_1O(C=O)OR_2$ and they are related to esters $R_1O(C=O)R$, ethers $R_1OR_2$, and also to inorganic carbonates. Small carbonate esters, such as dimethyl carbonate, ethylene carbonate, and propylene carbonate may be used as solvents. The concentration of carbonate-based solvent in the lost circulation treatment composition may range from about 1% to about 70% by weight of the lost circulation treatment composition. Alternatively, the concentration of carbonate-based solvent in the treatment fluid may range from about 1% to about 70%, about 2% to about 60%, about 3% to about 50%, about 4% to about 40%, about 5% to about 30%, or about 6% to about 20% by weight of the lost circulation treatment composition.

In some examples disclosed herein, the method of mitigating the loses in carbonate reservoirs may include several steps. The acid responsive polymer may be dispersed in a carrier fluid, wherein the carrier fluid may comprise water and a carbonate solvent. The fluid comprising the acid responsive polymer may be placed in a target zone. The target zone may be the lost circulation zone, which may be an opening that may extend from the wellbore into the subterranean formation. The target zone or the lost circulation zone may contain one or more features, including, but not limited to, natural or pre-existing fractures, cracks, vugs, channels, opening, or combinations thereof. After placement in the target zone, the acid responsive polymer may swell due to the following: (i) carbonic acid may be released from carbonate solvents; or (ii) carbon dioxide may be present in the carbonate formation. The swollen polymer may then be removed, if desired, by increasing the pH above 5 or de-swelling or breaking the polymer gel using oxidizers that include, but are not limited to, persulfates, peroxides, hypochlorite, chlorite, chlorate, perchlorate, ozone, permanganate, perborate, ceric ammonium nitrate and ceric sulfate.

The carrier fluid may be an aqueous fluid or a non-aqueous or an oil-based fluid, and may be present in an amount of about 50% to about 90% by weight of the lost circulation treatment composition. The aqueous fluid may include, but is not limited to, fresh water, sea water, water containing organic and/or inorganic dissolved salts, liquids containing water miscible organic compounds, solvents, or any combination thereof. For example, aqueous fluid may be formulated with mixtures of desired salts in fresh water. Salts dissolved in the aqueous fluid may include, but are not limited to, alkali metal and/or alkaline earth halides, hydroxides, and/or carboxylates, for example.

The aqueous fluid may include, but is not limited to, one or more salts of sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in the aqueous fluid may include any one or more of those present in natural seawater or any other organic or inorganic dissolved salts. Additionally, aqueous fluids may include natural or synthetic brines. Exemplary salts may include, but are not limited to, one or more of sodium chloride (NaCl), sodium bromide (NaBr), potassium chloride (KCl), potassium bromide (KBr), calcium chloride ($CaCl_2$)), calcium bromide ($CaBr_2$), zinc chloride ($ZnCl_2$), zinc bromide ($ZnBr_2$), magnesium chloride ($MgCl_2$), magnesium bromide ($MgBr_2$), sodium formate ($HCO_2Na$) potassium formate ($HCO_2K$), cesium formate ($HCO_2Cs$), ammonium chloride ($NH_4Cl$), ammonium bromide ($NH_4Br$), sodium acetate ($CH_3CO_2Na$), potassium acetate ($CH_3C\ O_2K$), hydrates thereof, or any combinations thereof.

The aqueous fluid may include a concentration of salt from about 0.01 wt % to about 20 wt %, or more, relative to the total weight of the lost circulation treatment composition. Alternatively, the aqueous fluid may include a concentration of salt from about 0.01 wt % to about 20 wt %, about 0.1 wt % to about 18 wt %, about 0.5 wt % to about 16 wt %, about 1 wt % to about 14 wt %, about 2 wt % to about 12 wt %, about 3 wt % to about 10 wt %, or about 4 wt % to about 8 wt % relative to the total weight of the lost circulation treatment composition.

The aqueous fluid may be present in an amount of about 50% to about 90% by weight of the lost circulation treatment composition. Alternatively, the aqueous fluid may be present in an amount of about 50% to about 90%, about 55% to about 85%, about 60% to about 80%, or about 65% to about 75% by weight of the lost circulation treatment composition.

The non-aqueous or oil-based carrier fluid may be selected from the group consisting of petroleum oil, natural oil, synthetically derived oil, mineral oil, silicone oil, kerosene oil, diesel oil, an alpha olefin, an internal olefin, an ester, a diester of carbonic acid, a paraffin, and combinations thereof. The non-aqueous carrier fluid may be present in an amount of about 50% to about 80% by weight of the lost circulation treatment composition. Alternatively, the non-aqueous carrier fluid may be present in an amount of about 50% to about 80%, about 55% to about 75%, or about 60% to about 80% by weight of the lost circulation treatment composition.

The lost circulation treatment composition may further comprise at least one additional lost circulation material selected from the group consisting of cedar bark, shredded cane stalks, mineral fiber, mica flakes, cellophane, calcium carbonate, ground rubber, polymeric materials, pieces of plastic, grounded marble, wood, nut hulls, plastic laminates, comcobs, cotton hulls, and combinations thereof. The lost circulation treatment composition may further comprise at least one viscosifier selected from the group consisting of colloidal agents, emulsion-forming agents, diatomaceous earth, biopolymers, synthetic polymers, chitosans, starches, gelatins, and combinations thereof.

The lost circulation materials included in the lost circulation treatment composition may have a multi-modal particle size distribution. For example, the lost circulation materials may have 2, 3, 4, 5, 6, or more modal peaks. Modal peaks may occur on a particle size distribution curve when there are increased particle concentrations relative to particle sizes on either side of the curve. The particle size of the lost circulation materials may be in a range of about 5 microns to about 4000 microns. With the benefit of this disclosure, one having ordinary skill in the art should be able to select a size of lost circulation material.

The lost circulation treatment compositions may further comprise a viscosifier to aid in suspending any of the lost circulation materials in the lost circulation treatment compositions. Suitable viscosifying agents may include, but are not limited to, colloidal agents (e.g., clays such as bentonite, polymers, and guar gum), emulsion-forming agents, diatomaceous earth, biopolymers, synthetic polymers, chitosans, starches, gelatins, or mixtures thereof. The clay may include a colloidal clay, nano clay, a synthetic clay, or a combination thereof. The viscosifier may be present in the lost circulation treatment composition in an amount of about 0.1% to about 2% by weight of the lost circulation treatment composition. Alternatively, the viscosifier may be present in an amount of about 0.1 to about 2%, about 0.25% to about 1.5%, or about 0.5% to about 1% by weight of the lost circulation treatment composition. One of ordinary skill in the art, with the benefit of this disclosure, should recognize the appropriate amount of viscosifier to include for a chosen application.

The lost circulation treatment compositions may further comprise an acid-soluble filler. The acid-soluble filler may be used, to provide an additional acid-soluble component so that more of the lost circulation treatment compositions can be dissolved and removed. This may be desirable, for example, if the lost circulation treatment composition is used in a producing zone. Examples of suitable acid-soluble fillers include dolomite, magnesium carbonate, calcium carbonate, and zinc carbonate. The acid-soluble filler may include sub-micron size filler having a particle size in the range of 100 nm to 1 micron and, for example, between 200 nm to 800 nm. For example, sub-micron-calcium carbonate may be used in accordance with the disclosure. The calcium carbonate may have a particle size greater than 1 micron. Where used, the acid-soluble filler may be present in the lost circulation treatment compositions in an amount of from about 0.1% to about 300% by weight of the lost circulation materials. The acid-soluble filler may be present in an amount of from about 15% to about 50% by weight of the lost circulation materials. One of ordinary skill in the art, with the benefit of this disclosure, should recognize the appropriate amount of acid-soluble filler to include for a chosen application.

Other additives suitable for use in the lost circulation treatment compositions may be used to enhance various properties of the lost circulation treatment compositions. Examples of such additives include, but are not limited to weighting agents, lightweight additives, dispersants, fluid loss control additives, thixotropic additives, and combinations thereof. A person having ordinary skill in the art, with the benefit of this disclosure, should be able to determine the type and amount of additive useful for a particular application and desired result.

Weighting agents are typically materials that weigh more than water and may be used to increase the density of the lost circulation treatment compositions. For example, weighting agents may have a specific gravity of about 2 or higher (e.g., about 2, about 4, etc.). Examples of weighting agents that may be used may include, but are not limited to, hematite, hausmannite, ilmenite, manganese tetroxide, barite, and combinations thereof.

Lightweight additives may be included in the lost circulation treatment compositions to acid responsive polymer decrease the density of the lost circulation treatment compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Dispersants may be included in the lost circulation treatment compositions to, disperse the lost circulation materials in the carrier fluid. Examples of suitable dispersants may include, without limitation, sulfonated-formaldehyde-based dispersants (e.g., sulfonated acetone formaldehyde condensate), polyoxymethylene phosphonates, and polyox (poly (ethylene oxide) polymers), polycarboxylates. Other suitable dispersants may be polycarboxylated ether dispersants. One of ordinary skill in the art, with the benefit of this disclosure, should recognize the appropriate type of dispersant to include for a chosen application.

Thixotropic additives may be included in the lost circulation treatment compositions to provide a lost circulation treatment composition that may be pumpable as a thin or low viscosity fluid, but when allowed to remain quiescent attains a relatively high viscosity. Among other things, thixotropic additives may be used to help control free water, create rapid gelation as the composition sets, combat lost circulation, prevent "fallback" in annular column, and minimize gas migration. Examples of suitable thixotropic additives include, but are not limited to, thixotropic clay, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art should appreciate that the lost circulation treatment compositions generally should have a density suitable for a particular application. By way of example, the lost circulation treatment compositions may have a density in the range of about 8 lb/gal (959 kg/m$^3$) to about 25 lb/gal (2996 kg/m$^3$). Alternatively, the lost circulation treatment compositions may have a density in the range of about 8 lb/gal (959 kg/m$^3$) to about 25 lb/gal (2996 kg/m$^3$), about 9 lb/gal (1078 kg/m$^3$) to about 20 lb/gal (2397 kg/m$^3$), or about 10 lb/gal (1198 kg/m$^3$) to about 15 lb/gal (1797 kg/m$^3$). Those of ordinary skill in the art, with the benefit of this disclosure, should recognize the appropriate density for a particular application.

Turning now to FIG. 1, an example operating environment for the methods and compositions described herein is shown. It should be noted that while FIG. 1 generally depicts a land-based operation, those skilled in the art should readily recognize that the principles described herein are equally applicable to subsea operations that employ floating or sea-based platforms and rigs, without departing from the scope of the disclosure. As illustrated, a drilling rig 100 may be positioned on the Earth's surface 102 extending over and around a wellbore 104 that penetrates a subterranean formation 106. While the wellbore 104 is shown extending generally vertically into the subterranean formation 106, the principles described herein are also applicable to wellbores that extend at an angle through the subterranean formation 106, such as horizontal and slanted wellbores. The wellbore 104 may be drilled into the subterranean formation 106 using any suitable drilling technique. The drilling rig 100 may comprise a derrick 108 with a rig floor 110 through which a work string 112 extends downward from the drilling rig 100 into the wellbore 104. Work string 112 may be any such string, casing, or tubular through which a fluid may flow. While not shown, the work string 112 may a deliver a wellbore servicing apparatus (e.g., a drill bit) or some part thereof to a predetermined depth within the wellbore 104. At least a portion of the wellbore 104 may be lined with a casing 114 that may be secured into position in the wellbore 104 using cement 116. Alternatively, the wellbore 104 may be partially cased and cemented thereby resulting in a portion of the wellbore 104 being open hole.

During any one or more wellbore drilling, completion, or servicing operations, a lost circulation zone 118 may be encountered. Where the lost circulation zone 118 is encountered, it may be desirable to employ the lost circulation treatment compositions disclosed herein to prevent, lessen, minimize, and/or cease the loss of fluids to the lost circulation zone 118. Placement of a lost circulation treatment composition into the lost circulation zone 118 may be an effective means of plugging or sealing off the lost circulation zone 118 and thereby preventing, ceasing, and/or substantially lessening the loss of fluids from the wellbore 104 to the lost circulation zone 118. While the lost circulation zone 118 is shown as an opening that extends from the wellbore 104 into the subterranean formation 106, it is contemplated that the lost circulation zone 118 may contain one or more features including, without limitation, fractures (natural or pre-existing), cracks, vugs, channels, openings, and/or the like. Moreover, while the lost circulation zone 118 is illustrated in an open hole section of the wellbore 104, it is contemplated that a lost circulation zone may also occur in a section of the wellbore 104 with the casing 114.

The lost circulation treatment compositions may be characterized as forming a non-flowable, elastic, and/or plugging gellable composition comprising the acid responsive polymers, the carbonate-based solvent; and the carrier fluid comprising water. The gellable composition may form a highly rubbery and elastic gel upon placement into or after entering the lost circulation zone or target zone 118 and may be characterized by an adjustable gel time, ranging from nearly instantaneous to a few hours.

As discussed, lost circulation zone 118 may be sealed or partially sealed with the lost circulation treatment compositions described herein. The lost circulation treatment compositions may be provided in a weighted or unweighted "pill" as represented by arrow 120 for introduction into the wellbore. Such pills typically comprise the lost circulation materials, including the acid-responsive polymers, blended with a small amount of carrier fluid. The amount of the lost circulation materials used in the pill will depend on the size of the lost circulation zone 118 to be treated. Multiple pills or treatments may be used if needed. Drilling may be stopped while the pill is introduced into and circulated in the wellbore 104. As illustrated in FIG. 1, the pill, as represented by arrow 120, may be pumped into wellbore 104 via work string 112, which exits below lost circulation zone 118. The pill 120 may be pumped up the wellbore annulus where it may enter lost circulation zone 118. Once spotted into place, the pill 120 may prevent or retard the entry of drilling or other wellbore fluids. Pressure may be used to squeeze the pill into the lost circulation zone 118. Alternatively, a lost circulation treatment composition may be added to the drilling fluid and circulated with the drilling fluid during drilling or servicing of the well.

Figure 2:
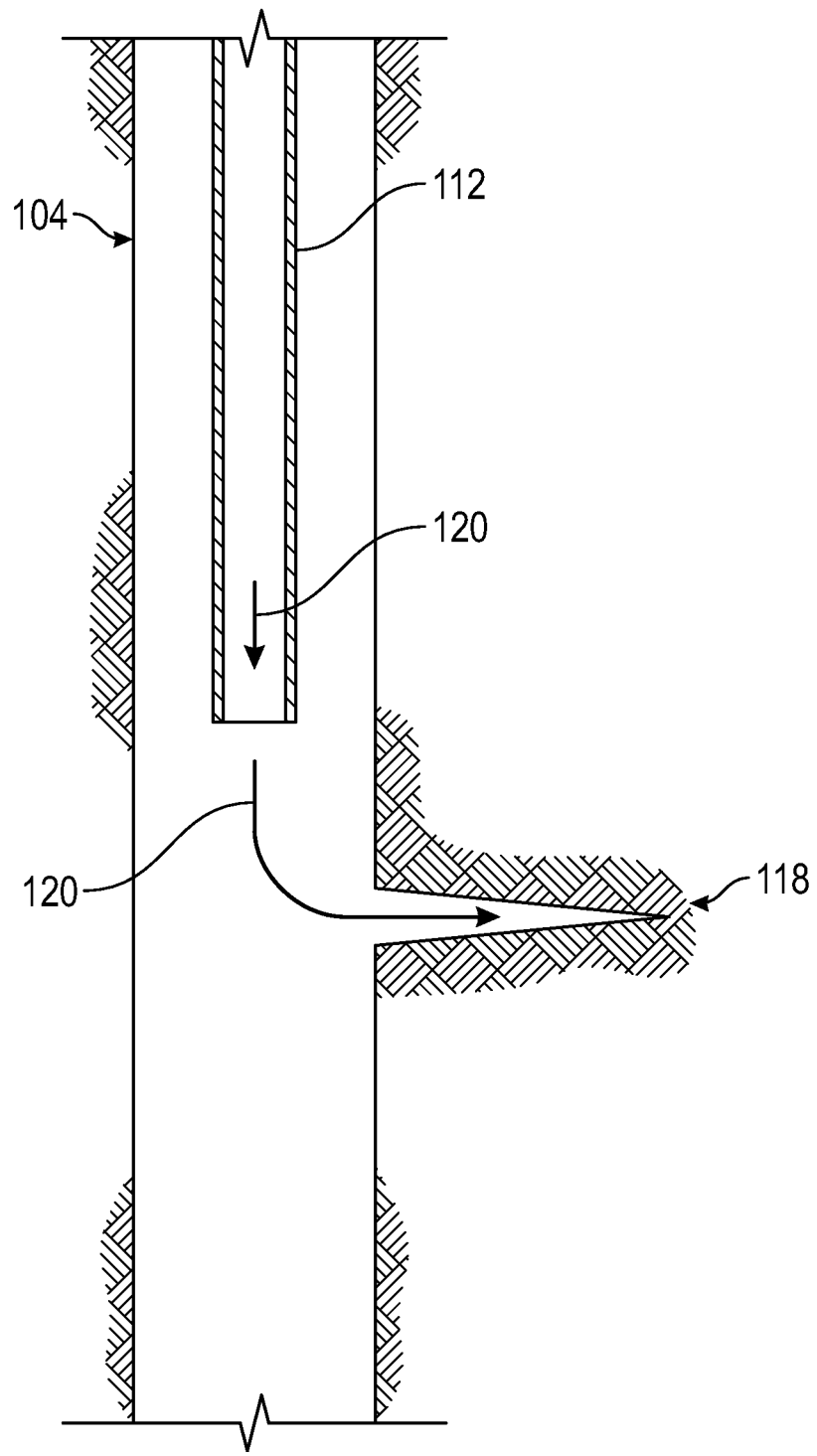
FIG. 2 illustrates another introduction of a lost circulation treatment composition into a lost circulation zone within a wellbore penetrating a subterranean formation in accordance with example embodiments of the present disclosure.

Turning now to FIG. 2, the lost circulation treatment compositions may be placed in the lost circulation zone 118 by work string 112, which for this example, exits above lost circulation zone or target zone 118. Optionally a plug, not shown, may be placed below the lost circulation zone 118. The pill, represented by arrow 120, may be pumped into a portion of the wellbore 114 near, proximate to, or within the lost circulation zone 118. At least a portion of the pill 120 may enter into the lost circulation zone 118 to prevent, cease, and/or substantially lessen the loss of fluids from the wellbore 104 to the lost circulation zone 118. In some alternative examples, the pill 120 may be pumped through a drill bit, not shown, however care should be used with this process so that the pill 120 does not block openings in the drill bit. The acid responsive polymer within the pill 1220 may swell after contact with water and a carbonate-based solvent injected into or placed within the wellbore. The swelling may enhance the ability of the pill 120 to prevent, cease, and/or substantially lessen the loss of fluids from the wellbore 104 to the lost circulation zone 118. If it is desirable to remove at least a portion of the pill 120, for example, if the pill is interfering with a producing zone, the pill 120 may be removed by introducing a fluid having a pH greater than 5 or by the addition of polymer degrading materials such as oxidizers and the like.

The exemplary lost circulation treatment compositions disclosed herein may directly or indirectly affect one or more components or pieces of equipment associated with the preparation, delivery, recapture, recycling, reuse, and/or disposal of the disclosed lost circulation treatment compositions. For example, the disclosed lost circulation treatment compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary lost circulation treatment compositions. The disclosed lost circulation treatment compositions may also directly or indirectly affect any transport or delivery equipment used to convey the lost circulation treatment compositions to a well site or downhole such as, for example, any transport vessels, conduits, pipelines, trucks, tubulars, and/or pipes used to compositionally move the lost circulation treatment compositions from one location to another, any pumps, compressors, or motors (e.g., topside or downhole) used to drive the lost circulation treatment compositions into motion, any valves or related joints used to regulate the pressure or flow rate of the lost circulation treatment compositions, and any sensors (i.e., pressure and temperature), gauges, and/or combinations thereof, and the like. The disclosed lost circulation treatment compositions may also directly or indirectly affect the various downhole equipment and tools that may come into contact with the lost circulation treatment compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

Accordingly, the methods and compositions disclosed herein may be directed to corrosion inhibition and hydrate inhibition in a subsea well. The methods and compositions disclosed herein, including one or more of the following statements:

Statement 1. A method for mitigating a lost circulation zone comprising: providing a lost circulation treatment composition comprising an acid responsive polymer comprising at least one monomer, at least one comonomer, and at least one crosslinker; a carbonate-based solvent; and a carrier fluid comprising water; introducing the lost circulation treatment composition into a wellbore within a subterranean formation, wherein the subterranean formation comprises the lost circulation zone; placing the lost circulation treatment composition into the lost circulation zone; and hydrolyzing the carbonate-based solvent to generate carbon dioxide.

Statement 2. The method of statement 1, wherein the at least one monomer is selected from the group consisting of aminoalkyl acrylates, aminoalkyl methacrylates, 2-vinyl pyridine, 4-vinyl pyridine, salts thereof, derivatives thereof, and any combination thereof, and wherein the at least one monomer has a chemical formula:

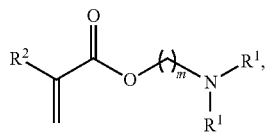

wherein each $R^1$ and $R^2$ is independently a substituted or unsubstituted linear, branched, cyclic, heterocyclic, or aromatic hydrocarbyl group and m is an integral of 1, 2, 3, 4, 5, 6, 7, 8, 9, or 10.

Statement 3. The method of statement 1 or 2, wherein each $R^1$ is independently a $C_1$-$C_{10}$ alkyl, $R^2$ is a substituted or unsubstituted linear, branched, cyclic, heterocyclic, or aromatic hydrocarbyl group, and m is an integral in a range from 1 to 5.

Statement 4. The method of any of the preceding statements, wherein the comonomer is an alkene or mono-vinyl having a chemical formula $R^3$—CH=$CH_2$, wherein $R^3$ is a substituted or unsubstituted linear, branched, cyclic, heterocyclic, or aromatic hydrocarbyl group.

Statement 5. The method of statement 4, wherein $R^3$ is a phenyl, an aryl, or a $C_1$-$C_{10}$ alkyl.

Statement 6. The method of any of the preceding statements, wherein the crosslinker has a chemical formula:

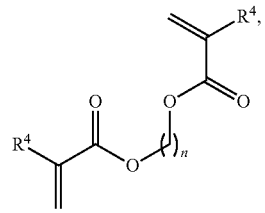

wherein each $R^4$ is independently a substituted or unsubstituted linear, branched, cyclic, heterocyclic, or aromatic hydrocarbyl group and n is an integral of 1, 2, 3, 4, 5, 6, 7, 8, 9, or 10.

Statement 7. The method of statement 6, wherein each $R^4$ is independently a $C_1$-$C_{10}$ alkyl, a phenyl, or an aryl and n is an integral in a range from 1 to 5.

Statement 8. The method of any of the preceding statements, wherein the carbonate-based solvent is a carbonate ester selected from the group consisting of dimethyl carbonate, ethylene carbonate, propylene carbonate, butylene carbonate, glycerol carbonate, and combinations thereof.

Statement 9. The method of any of the preceding statements, further comprising swelling at least a portion of the acid responsive polymer.

Statement 10. The method of statement 9, further comprising de-swelling at least a portion of the acid responsive polymer and removing at least a portion of the acid responsive polymer from the subterranean formation.

Statement 11. A method for mitigating a lost circulation zone comprising: providing a lost circulation treatment composition comprising an acid responsive polymer comprising at least one monomer, at least one comonomer, and at least one crosslinker; a carbonate ester solvent selected from the group consisting of dimethyl carbonate, ethylene carbonate, propylene carbonate, butylene carbonate, glycerol carbonate, and combinations thereof; and a carrier fluid comprising water; introducing the lost circulation treatment composition into a wellbore within a subterranean formation, wherein the subterranean formation comprises the lost circulation zone; placing the lost circulation treatment composition into the lost circulation zone; hydrolyzing the carbonate ester solvent to generate carbon dioxide; and swelling at least a portion of the acid responsive polymer in the lost circulation zone.

Statement 12. The method of statement 11, wherein the at least one monomer is selected from the group consisting of aminoalkyl acrylates, aminoalkyl methacrylates, 2-vinyl pyridine, 4-vinyl pyridine, salts thereof, derivatives thereof, or any combination thereof, and wherein the at least one monomer has a chemical formula:

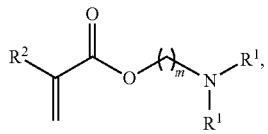

wherein each $R^1$ and $R^2$ is independently a substituted or unsubstituted linear, branched, cyclic, heterocyclic, or aromatic hydrocarbyl group and m is an integral of 1, 2, 3, 4, 5, 6, 7, 8, 9, or 10.

Statement 13. The method of statement 11 or 12, wherein the comonomer is an alkene or mono-vinyl having a chemical formula $R^3$—CH=$CH_2$, wherein $R^3$ is a substituted or unsubstituted linear, branched, cyclic, heterocyclic, or aromatic hydrocarbyl group Statement 14. The method of statements 11, 12, or 13, wherein the crosslinker has a chemical formula:

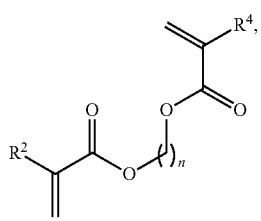

wherein each $R^4$ is independently a substituted or unsubstituted linear, branched, cyclic, heterocyclic, or aromatic hydrocarbyl group and n is an integral of 1, 2, 3, 4, 5, 6, 7, 8, 9, or 10.

Statement 15. The method of statements 11, 12, 13, or 14, further comprising de-swelling at least a portion of the acid responsive polymer and removing at least a portion of the acid responsive polymer from the subterranean formation.

Statement 16. A lost circulation treatment composition comprising: an acid responsive polymer comprising at least one monomer, at least one comonomer, and at least one crosslinker; a carbonate-based solvent; and a carrier fluid comprising water.

Statement 17. The lost circulation treatment composition of statement 16, wherein the at least one monomer is selected from the group consisting of aminoalkyl acrylates, aminoalkyl methacrylates, 2-vinyl pyridine, 4-vinyl pyridine, salts thereof, derivatives thereof, and any combination thereof, and wherein the at least one monomer has a chemical formula:

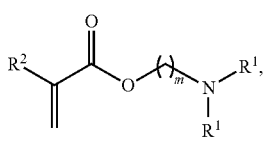

wherein each $R^1$ and $R^2$ is independently a substituted or unsubstituted linear, branched, cyclic, heterocyclic, or aromatic hydrocarbyl group and in is an integral of 1, 2, 3, 4, 5, 6, 7, 8, 9, or 10.

Statement 18. The lost circulation treatment composition of statements 16 or 17, wherein the comonomer is an alkene or mono-vinyl having a chemical formula R—CH=$CH_2$, wherein $R^3$ is a substituted or unsubstituted linear, branched, cyclic, heterocyclic, or aromatic hydrocarbyl group.

Statement 19. The lost circulation treatment composition of statements 16, 17, or 18, wherein the crosslinker has a chemical formula:

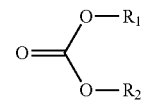

wherein each $R^4$ is independently a substituted or unsubstituted linear, branched, cyclic, heterocyclic, or aromatic hydrocarbyl group and n is an integral of 1, 2, 3, 4, 5, 6, 7, 8, 9, or 10.

Statement 20. The lost circulation treatment composition of claims 16, 17, 18, or 19, wherein the carbonate-based solvent is a carbonate ester solvent selected from the group consisting of dimethyl carbonate, ethylene carbonate, propylene carbonate, butylene carbonate, glycerol carbonate, and combinations thereof; and wherein the carbonate-based solvent hydrolyzes to generate carbon dioxide.

To facilitate a better understanding of the present disclosure, the following examples are given. In no way should the following examples be read to limit, or to define, the scope of the disclosure.

EXAMPLE 1

Figure 3:
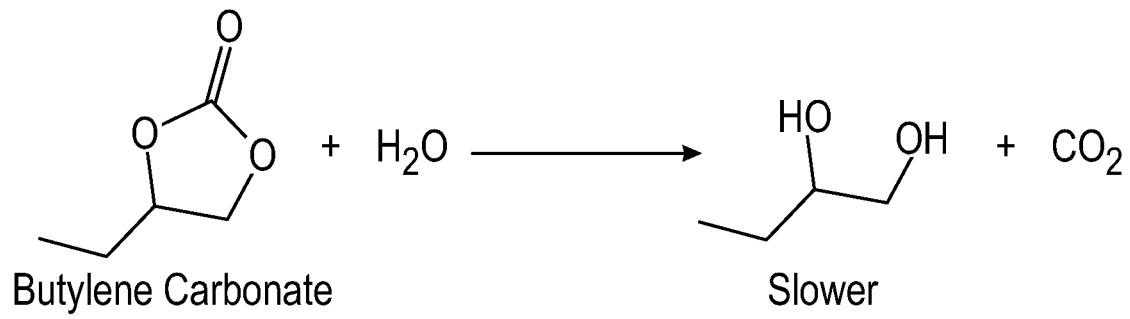
FIG. 3 depicts hydrolysis of carbonate ester solvent in accordance with example embodiments of the present disclosure.
Figure 3:
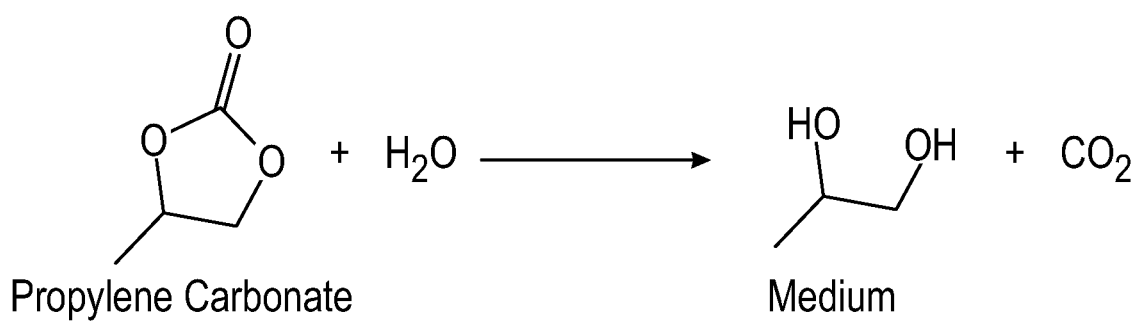
Figure 3:
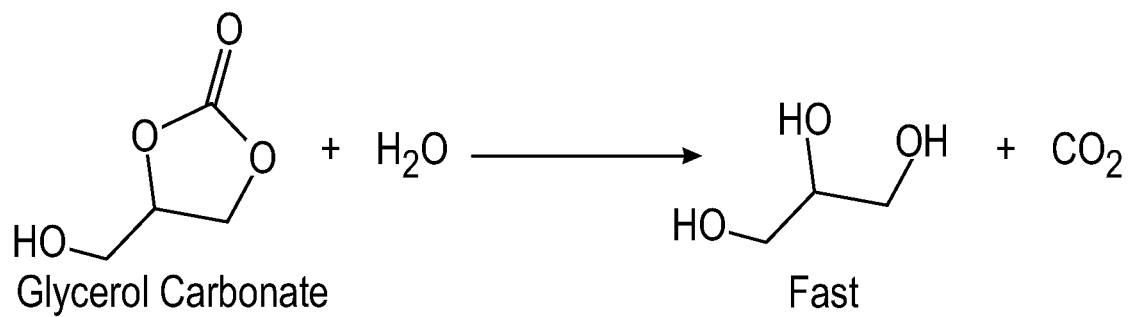

Organic carbonates may be miscible with water, or mostly miscible with water, oil, or combinations thereof. The carbonic acid esters disclosed herein regenerate carbon dioxide and eventually carbonic acid in the presence of water. The rate of carbonic acid generation varies, depending upon the functional groups present. FIG. 3 depicts an example of the hydrolysis of carbonate ester solvent from the chemical structure of the carbonate ester group (an ester of carbonic acid) shown below:

$$O=C\begin{matrix}O-R_1\\O-R_2\end{matrix}$$

N,N-Dimethylaminoethyl Methacrylate (DMAEMA) was selected as an acid responsive monomer. DMAEMA comprises an amine functional group that interacts with carbonic acid or acid in the system. The cross-linked network of DMAEMA polymer was formed by a free-radical polymerization method using ethylene glycol dimethacrylate (EDGMA) as a cross-linker and Styrene (Sty) as a co-monomer. Styrene imparts the strength required for the cross-linked network. The monomers and cross-linker utilized to synthesize the carbon dioxide/acid responsive polymer network are shown below:

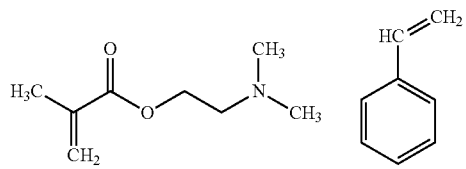

N, N' Dimethylaminoethyl methacrylate (DMAEMA)  Styrene (Sty)

-continued

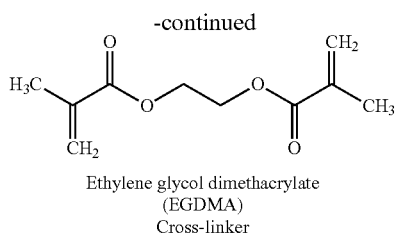

Ethylene glycol dimethacrylate
(EGDMA)
Cross-linker

The monomer(s) and cross-linker were mixed together in a reaction vessel, then the azobisisobutyronitrile (AIBN) initiator (1 mole % based on total moles of DMAEMA, Styrene and EGDMA) was added to the mixture. The polymerization mixture was purged with $N_2$ for 15 minutes and then sealed. The reaction was carried out at 158° F. (70° C.) for 20 hours using bulk polymerization method. The cross-linked polymer was repeatedly washed with methanol to remove the unreacted monomer. The polymer was solid material, which can be easily ground into particles to achieve a shape or to form a free-flowing powder. These particles may be easily dispersed in drilling fluid. The co-monomer composition of the polymer, which comprises monomers and cross-linkers, can be altered to vary the swelling rate and the extent of swelling.

EXAMPLE 2

Polymer behavior in the carbonate solvent was evaluated by dispersing the polymer in a solution of carbonate solvent (30% v/v) in water. Two different carbonate solvents were used to test the swelling of the polymer. The solvents used were butylene carbonate and propylene carbonate. Polymer was added to the solvent-water mixture. The test solutions were observed at room temperature. The swelled polymer weight was measured after 4 hours and then after 24 hours. Table 1 below displays the percent swelling of the polymer after testing:

TABLE 1

| Time (hrs) | % Swelling in Water (at Room Temperature) | % Swelling in Butylene Carbonate (at Room Temperature) | % Swelling in Propylene Carbonate (at Room Temperature) |
| --- | --- | --- | --- |
| 4 | 251 | 283 | 531 |
| 24 | 280 | 805 | 885 |

Referring to Table 1, after 4 hours, the rate of swelling was slow in the butylene carbonate solution, by comparison to the propylene carbonate solution. After 24 hours, both samples had a relatively comparable percentage of swelling values, thereby indicating that the concentration of $CO_2$ released in the solution was equal in both solvents, but the rate of release is different.

EXAMPLE 3

The effect of concentration of solvent in the solution on polymer behavior evaluated by dispersing the polymer in a solution comprising varying ratio of solvent and water, wherein the results are shown in Table 2. The results show how the polymer swells in the presence of carbonate solvent by comparison to "only water". The results indicate that lower concentrations of the propylene carbonate solution were sufficient for the swelling of the polymer. As the extent of swelling was higher in the presence of 10% and 30% of propylene carbonate, by comparison to the 70% and 50% of the propylene carbonate. Hence, the results indicate swelling can also be tuned by varying/adjusting the concentration of carbonate ester in the solution.

TABLE 2

| Specimen | % Water | % Propylene Carbonate | % Swelling After 24 Hrs. at Room Temperature |
| --- | --- | --- | --- |
| 1 | 90 | 10 | 990 |
| 2 | 70 | 30 | 890 |
| 3 | 30 | 70 | 750 |
| 4 | 50 | 50 | 550 |
| 5 | 100 | 0 | 293 |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

It should be understood that the compositions and methods are described in terms of "comprising," "containing," or "including" various components or steps, the compositions and methods can also "consist essentially of" or "consist of" the various components and steps.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure.

What is claimed is:
1. A method for mitigating a lost circulation zone comprising:
providing a lost circulation treatment composition comprising an acid responsive polymer comprising at least one monomer, at least one comonomer, and at least one crosslinker; a carbonate-based solvent; and a carrier fluid comprising water;

introducing the lost circulation treatment composition into a wellbore within a subterranean formation, wherein the subterranean formation comprises the lost circulation zone;

placing the lost circulation treatment composition into the lost circulation zone; and hydrolyzing the carbonate-based solvent to generate carbon dioxide causing the acid responsive polymer to change shape and mitigating losses in the lost circulation zone.

2. The method of claim 1, wherein the at least one monomer is selected from the group consisting of aminoalkyl acrylates, aminoalkyl methacrylates, 2-vinyl pyridine, 4-vinyl pyridine, salts thereof, derivatives thereof, and any combination thereof, and wherein the at least one monomer has a chemical formula:

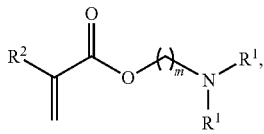

wherein each $R^1$ and $R^2$ is independently a substituted or unsubstituted linear, branched, cyclic, heterocyclic, or aromatic hydrocarbyl group and m is an integral of 1, 2, 3, 4, 5, 6, 7, 8, 9, or 10.

3. The method of claim 2, wherein each $R^1$ is independently a $C_1$-$C_{10}$ alkyl, $R^2$ is a substituted or unsubstituted linear, branched, cyclic, heterocyclic, or aromatic hydrocarbyl group, and m is an integral in a range from 1 to 5.

4. The method of claim 1, wherein the comonomer is an alkene or mono-vinyl having a chemical formula $R^3$—CH=$CH_2$, wherein $R^3$ is a substituted or unsubstituted linear, branched, cyclic, heterocyclic, or aromatic hydrocarbyl group.

5. The method of claim 4, wherein $R^3$ is a phenyl, an aryl, or a $C_1$-$C_{10}$ alkyl.

6. The method of claim 1, wherein the crosslinker has a chemical formula:

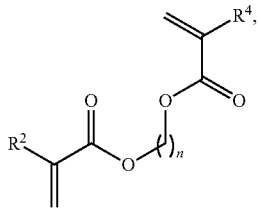

wherein each $R^4$ is independently a substituted or unsubstituted linear, branched, cyclic, heterocyclic, or aromatic hydrocarbyl group and n is an integral of 1, 2, 3, 4, 5, 6, 7, 8, 9, or 10.

7. The method of claim 6, wherein each $R^4$ is independently a $C_1$-$C_{10}$ alkyl, a phenyl, or an aryl and n is an integral in a range from 1 to 5.

8. The method of claim 1, wherein the carbonate-based solvent is a carbonate ester selected from the group consisting of dimethyl carbonate, ethylene carbonate, propylene carbonate, butylene carbonate, glycerol carbonate, and combinations thereof.

9. The method of claim 1 further comprising swelling at least a portion of the acid responsive polymer.

10. The method of claim 9, further comprising de-swelling at least a portion of the acid responsive polymer and removing at least a portion of the acid responsive polymer from the subterranean formation.

11. A method for mitigating a lost circulation zone comprising:

providing a lost circulation treatment composition comprising an acid responsive polymer comprising at least one monomer, at least one comonomer, and at least one crosslinker; a carbonate ester solvent selected from the group consisting of dimethyl carbonate, ethylene carbonate, propylene carbonate, butylene carbonate, glycerol carbonate, and combinations thereof; and a carrier fluid comprising water;

introducing the lost circulation treatment composition into a wellbore within a subterranean formation, wherein the subterranean formation comprises the lost circulation zone;

placing the lost circulation treatment composition into the lost circulation zone;

hydrolyzing the carbonate ester solvent to generate carbon dioxide causing the acid responsive polymer to change shape; and mitigating losses in the lost circulation zone.

12. The method of claim 11, wherein the at least one monomer is selected from the group consisting of aminoalkyl acrylates, aminoalkyl methacrylates, 2-vinyl pyridine, 4-vinyl pyridine, salts thereof, derivatives thereof, and any combination thereof, and wherein the at least one monomer has a chemical formula:

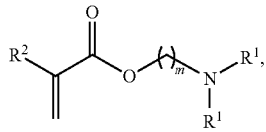

wherein each $R^1$ and $R^2$ is independently a substituted or unsubstituted linear, branched, cyclic, heterocyclic, or aromatic hydrocarbyl group and m is an integral of 1, 2, 3, 4, 5, 6, 7, 8.9, or 10.

13. The method of claim 11, wherein the comonomer is an alkene or mono-vinyl having a chemical formula $R^3$—CH=$CH_2$, wherein $R^3$ is a substituted or unsubstituted linear, branched, cyclic, heterocyclic, or aromatic hydrocarbyl group.

14. The method of claim 11, wherein the crosslinker has a chemical formula:

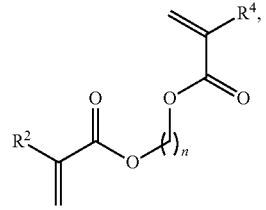

wherein each $R^4$ is independently a substituted or unsubstituted linear, branched, cyclic, heterocyclic, or aromatic hydrocarbyl group and n is an integral of 1, 2, 3, 4, 5, 6, 7, 8, 9, or 10.

15. The method of claim 11, further comprising de-swelling at least a portion of the acid responsive polymer and removing at least a portion of the acid responsive polymer from the subterranean formation.

16. A lost circulation treatment composition comprising:
an acid responsive polymer comprising at least one monomer, at least one comonomer, and at least one crosslinker;
a carbonate-based solvent, wherein the carbonate-based solvent is a carbonate ester solvent selected from the group consisting of dimethyl carbonate, ethylene carbonate, propylene carbonate, butylene carbonate, glycerol carbonate, and combinations thereof; and wherein the carbonate-based solvent hydrolyzes downhole to generate carbon dioxide; and
a carrier fluid comprising water.

17. The lost circulation treatment composition of claim 16, wherein the at least one monomer is selected from the group consisting of aminoalkyl acrylates, aminoalkyl methacrylates, 2-vinyl pyridine, 4-vinyl pyridine, salts thereof, derivatives thereof, and any combination thereof, and wherein the at least one monomer has a chemical formula:

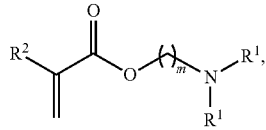

wherein each $R^1$ and $R^2$ is independently a substituted or unsubstituted linear, branched, cyclic, heterocyclic, or aromatic hydrocarbyl group and m is an integral of 1, 2, 3, 4, 5, 6, 7, 8, 9, or 10.

18. The lost circulation treatment composition of claim 16, wherein the comonomer is an alkene or mono-vinyl having a chemical formula $R^3$—CH=$CH_2$, wherein $R^3$ is a substituted or unsubstituted linear, branched, cyclic, heterocyclic, or aromatic hydrocarbyl group.

19. The lost circulation treatment composition of claim 16, wherein the crosslinker has a chemical formula:

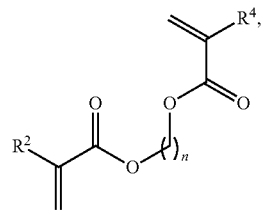

wherein each $R^4$ is independently a substituted or unsubstituted linear, branched, cyclic, heterocyclic, or aromatic hydrocarbyl group and n is an integral of 1, 2, 3, 4, 5, 6, 7, 8, 9, or 10.

20. The method of claim 19, wherein each $R^4$ is independently a $C_1$-$C_{10}$ alkyl, a phenyl, or an aryl and n is an integral in a range from 1 to 5.

* * * * *